(12) United States Patent
Fitzgerald et al.

(10) Patent No.: US 11,067,920 B2
(45) Date of Patent: Jul. 20, 2021

(54) ASYMMETRIC KEY FEATURES

(71) Applicant: Hewlett-Packard Development Company, L.P., Spring, TX (US)

(72) Inventors: Sean Daniel Fitzgerald, Boise, ID (US); Gabriel Scott McDaniel, Boise, ID (US); Jeffrey H. Luke, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,875

(22) PCT Filed: Aug. 30, 2018

(86) PCT No.: PCT/US2018/048745
§ 371 (c)(1),
(2) Date: Oct. 15, 2020

(87) PCT Pub. No.: WO2020/046314
PCT Pub. Date: Mar. 5, 2020

(65) Prior Publication Data
US 2021/0165340 A1 Jun. 3, 2021

(51) Int. Cl.
*G03G 15/08* (2006.01)
*G03G 21/18* (2006.01)
(Continued)

(52) U.S. Cl.
CPC ............ *G03G 15/087* (2013.01); *B33Y 30/00* (2014.12); *B41J 2/1755* (2013.01);
(Continued)

(58) Field of Classification Search
CPC ............ G03G 15/0865; G03G 15/087; G03G 15/0877; G03G 15/0879; G03G 2221/0654
(Continued)

(56) References Cited

U.S. PATENT DOCUMENTS 4,907,019 A 3/1990 Stephens
5,075,724 A 12/1991 Wada et al.
(Continued)

FOREIGN PATENT DOCUMENTS

DE 298 06 387 U1 6/1998
EP 0 689 104 A1 12/1995
(Continued)

*Primary Examiner* — Hoan H Tran
(74) *Attorney, Agent, or Firm* — Jefferson IP Law, LLP

(57) ABSTRACT

An example print component includes a container interface with a guide feature to guide rotation and a rotationally asymmetric key feature. An example toner component includes a recess to receive a toner container, a guide feature to guide rotation of the toner container, and an asymmetric key feature embedded in the guide feature to guide a container material interface towards a component material interface upon rotation. An example container may have a periphery with a rotationally asymmetric surface plane to guide rotation of the container and a protrusion extending from the periphery that has a key feature defined by edges rotationally asymmetric with respect to the periphery. An example container may include a mechanical interface including an asymmetrically-located key feature that, upon rotation of the print material container, generates a sealing force substantially perpendicular to the direction of rotation.

15 Claims, 12 Drawing Sheets

(51) Int. Cl.
  *B41J 2/175* (2006.01)
  *B33Y 30/00* (2015.01)
(52) U.S. Cl.
  CPC ....... *B41J 2/17546* (2013.01); *B41J 2/17553* (2013.01); *G03G 15/0863* (2013.01); *G03G 21/1871* (2013.01); *G03G 21/1885* (2013.01); *G03G 2215/0673* (2013.01); *G03G 2215/0678* (2013.01)
(58) Field of Classification Search
  USPC .................. 399/119, 120, 252, 258–262
  See application file for complete search history.

(56) References Cited

U.S. PATENT DOCUMENTS

| | | | |
|---|---|---|---|
| 6,152,555 | A | 11/2000 | Nozawa et al. |
| 6,209,996 | B1 | 4/2001 | Gasvoda et al. |
| 6,304,739 | B1 * | 10/2001 | Katsuyama ........ G03G 15/0874 222/DIG. 1 |
| 7,090,343 | B2 | 8/2006 | Steinmetz et al. |
| 9,399,349 | B2 | 7/2016 | Ohnishi |

FOREIGN PATENT DOCUMENTS

| | | |
|---|---|---|
| EP | 0 854 394 A2 | 7/1998 |
| EP | 1 089 135 A2 | 4/2001 |
| EP | 1 209 537 A2 | 5/2002 |

\* cited by examiner

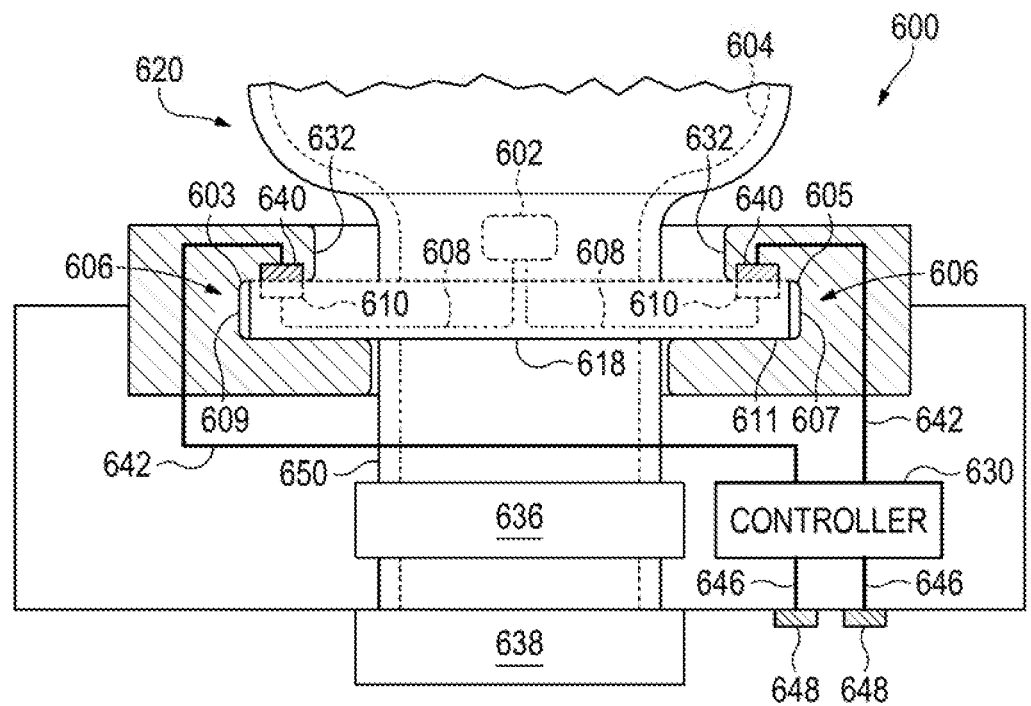
FIG. 6
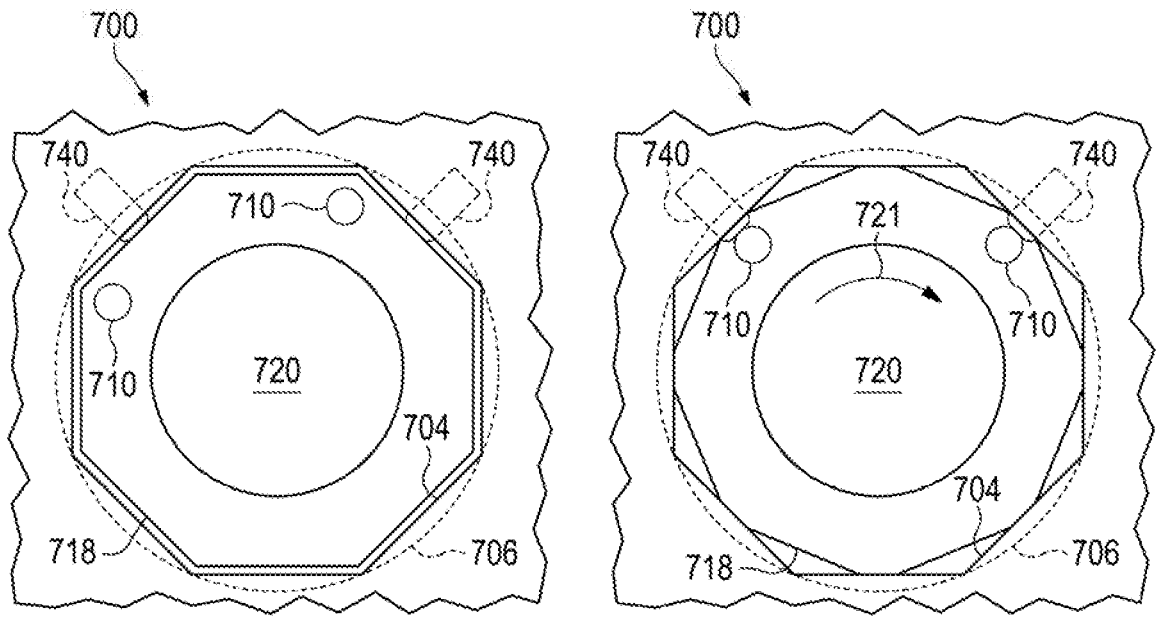
FIG. 7A  FIG. 7B

ASYMMETRIC KEY FEATURES

BACKGROUND

Images are processed for use with computing machines, such as a print apparatus. A print apparatus, for example, may use control data based on processed image data to produce a physical representation of an image by operating a print material placement system according to the control data. The print apparatus may include a print material receiving station to receive a container of print material to use in producing the physical representation.

BRIEF DESCRIPTION OF THE DRAWINGS

FIG. 6 is a sectional view of an example container coupled to an example component.

FIGS. 7A-7B, 8A-8B, 9A-9B, 10A-10B, 11A-11B, 12A-12B, 13A-13B, 14A-14B and 15A-15C are top views of example interface states between example print components and example print material containers.

DETAILED DESCRIPTION

Figure 1A:
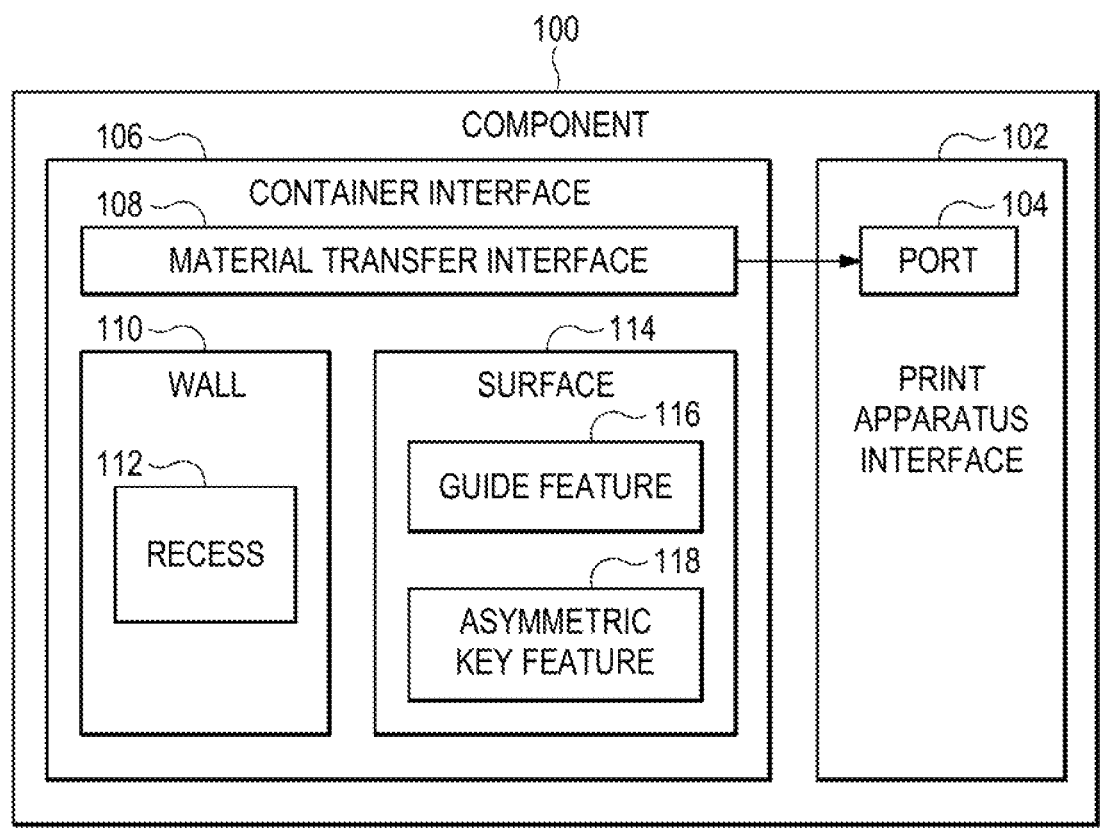
FIG. 1A is a block diagram depicting an example print component.

In the following description and figures, some example implementations of print apparatus, print components, and print material containers are described. In examples described herein, a "print apparatus" may be a device to print content on a physical medium (e.g., paper, textiles, a layer of powder-based build material, etc.) with a print material (e.g., ink or toner). In some examples, the physical medium printed on may be a web roll or a pre-cut sheet. In the case of printing on a layer of powder-based build material, the print apparatus may utilize the deposition of print materials in a layer-wise additive manufacturing process. A print apparatus may utilize suitable print consumables, such as ink, toner, fluids, powders, or other raw materials for printing. In some examples, a print apparatus may be a three-dimensional (3D) print apparatus. An example of print material is powder toner heatable by a heat transfer device, such as carbon-based toner, plastic-based toner, or a plant-derived toner heatable by a laser or fuser. Another example of fluid print material is a water-based latex ink ejectable from a print head, such as a piezoelectric print head or a thermal inkjet print head. Other examples of print fluid may include dye-based color inks, pigment-based inks, solvents, gloss enhancers, fixer agents, and the like. Toner and 3D-print powder are examples of print materials that are particles (i.e., print particles). Some print particles, such as 3D-print particles may have an average diameter of 50 microns, where other print particles, such as laser toner particles, may have an average diameter of 20 microns. The print material container may be a print particle container to provide a supply of print particles to a host device. For example, the print material container may be a print particle supply container to supply print particles to a print particle receptacle of a print system.

In some example print apparatus, an exchangeable and/or rechargeable print material container may be used. The print material container may be attachable and detachable to a print component coupleable to a print apparatus. For example, a toner vessel may be charged and connected to a toner cartridge that is insertable into a toner receiving station of a laser print apparatus. The print component may be a component of a printer such as a print cartridge or a print receptacle that receives a container of print material. The print component may be attachable (e.g., a replaceable part) to a print apparatus or integral to a printer structure (e.g., a fixed part). The print material container may be sealingly connectable (e.g., able to connect in a manner that generates a seal) to the print apparatus (via the print component) to provide print material from the print material container to the print apparatus to use in a printing operation. The print component and/or the print apparatus may utilize information about the print material vessel and/or print component in an operation of the print apparatus. For example, a print component may feature an electronic chip (e.g., a memory resource) attached, after assembly, to a print component that is capable of reporting data and/or record data. The mechanical interface of the container may influence the transfer path environment between the container and the component. A poor mechanical connection with the print material container may fail to transfer an appropriate amount of print material and/or data signals to the component and/or the print apparatus.

Various examples described below relate to an interface between a print component and a print material container with a rotationally asymmetric key feature that guides movement of a port towards a connection location upon rotation of the print material container. By providing a mechanical interface to assist rotation, the print material container may securely generate a physical connection with the print component.

Figure 1B:
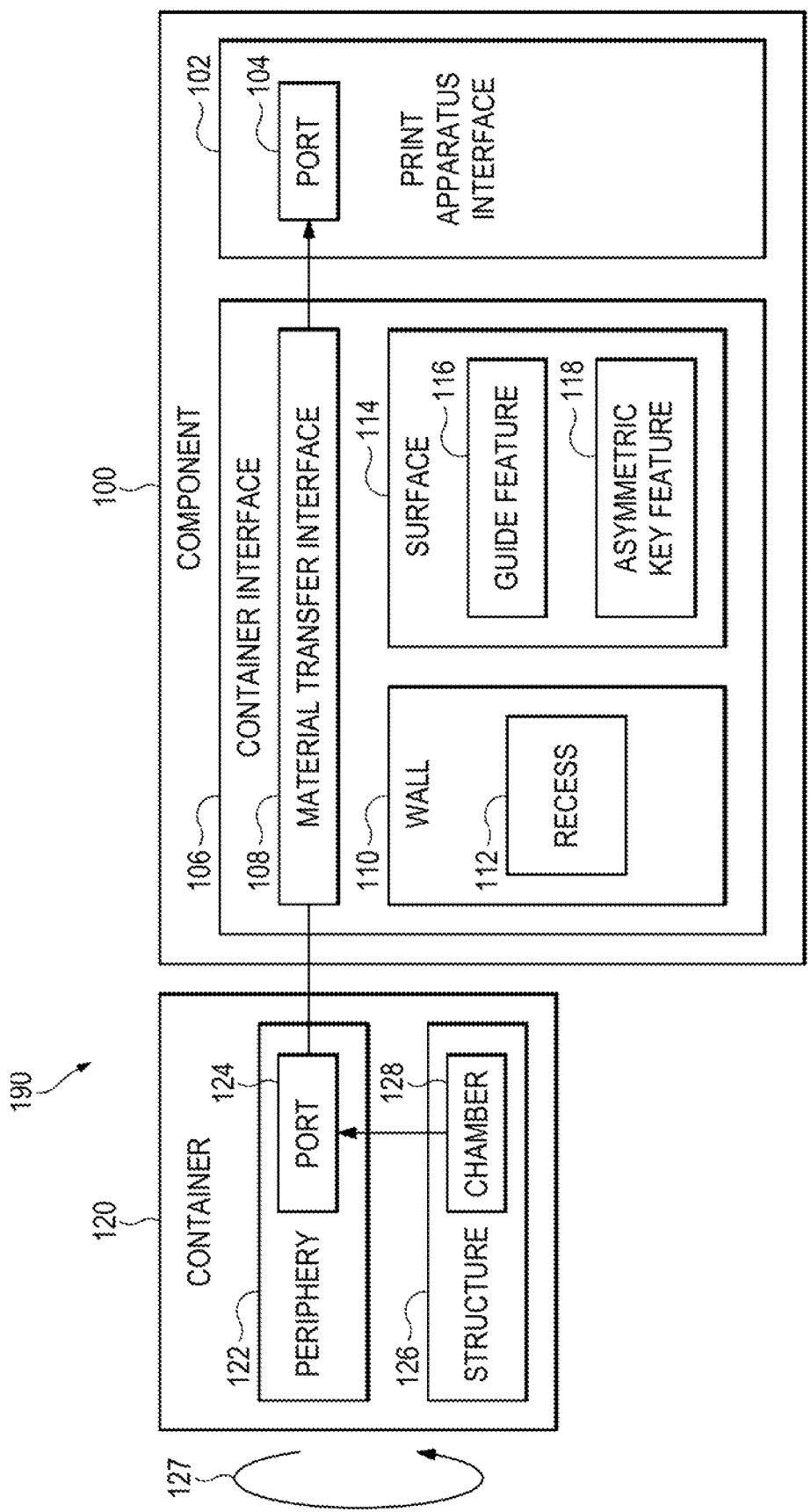
FIG. 1B is a block diagram depicting an example print container coupled to an example print component.

FIG. 1A is a block diagram depicting an example print component 100, and FIG. 1B is a block diagram depicting an example print container 120 coupled to an example print component 100. The example print component 100 generally includes a print apparatus interface 102 and a container interface 106. The print components discussed herein may be referred to herein as example components, such as cartridges or receptacles to receive a container and/or provide a supply of print material to a print apparatus. The print apparatus interface 102 is a mechanical interface that includes a surface defining a port 104 capable of providing print material to a print material delivery system of a print apparatus. The container interface 106 is a mechanical interface that includes a material transfer interface 108, a wall 110, and a guide surface 114. For example, the guide structure 102 may include an interface, such as a recess 112 and a surface with a guide feature 116, to couple to a print material container 120 to the print component 100. A single element depicted in any of the figures herein may represent a plurality of that element except where stated otherwise.

The material transfer interface 108 may include a surface defining a port capable of receiving print material from a print material container, such as print material container 120 of FIG. 1B, and/or a channel to transfer the print material to the print apparatus interface 102. In this manner, the material transfer interface 108 may be coupleable to a port 104 of the print apparatus interface 102 and a port 124 of a print material container 120. The interfaces discussed herein may assist forming a mechanical connection between the print material container 120 and the print component 100 and may also assist forming an electrical connection between the print material container 120 and the print component 100.

The recess 112 of FIGS. 1A and 1B defines an interface to receive a print material container 120 in a placement direction. The placement direction may be towards a docked position of the print material container 120 where the print material container 120 is securely connected within the recess 112 to the print component 100 to transfer print material to the print component 100, for example. The recess 112 may guide the print material container to a port 104 in the placement direction as shown in FIG. 1B, where, upon rotation 127 of the container 120 (as guided by the components of the interface 106), the port 124 is guided towards the material transfer interface 108.

The guide feature 116 may include a guideway. As used herein, a guideway is a track along which something moves. For example, the guide feature 116 may include a groove that receives a guideway counterpart (e.g., a protruding feature that fits in the guideway) of a print material container 120 and allows the guideway counterpart of the print material container 120 to move along the groove. The guideway may be a recessed path or cavity that allows for translational and/or rotational movement along the path or within the cavity. The guide feature 116 may include a wall or surface that supports rotation of the print material container 120 about an axis. The rotation about an axis may be centric or eccentric with respect to the print material container and/or the print apparatus interface 102.

The wall 110 may include a surface defining a boundary of a recess 112. The recess 112 may receive the container 120. For example, the recess 112 may receive a portion of a periphery 122 of the container 120 defining a port 124. The shape of the recess 112 may correspond to the shape of the periphery 122 of the print material container 120. The recess 112 may be a cavity directed in a placement direction from surface of the wall 110 where the container 120 may be inserted in the placement direction into the recess 112.

The surface 114 may define a guide feature 116 and a key feature 118. The guide feature 116 includes a shape to guide rotation of the print material container about an axis along a direction of the recess. The key feature 118 includes a rotationally asymmetric shape that guides movement of the second port towards the material transfer interface 108. The key feature 118 is rotationally asymmetric with respect to the periphery 122 of the print material container 120. As used herein, the term "key" means something that controls access. In this manner, the container 120 is guided by the guide feature 116 and key feature 118 towards an orientation to connect to the material transfer interface 108 upon rotation of container 120.

As used herein, rotationally asymmetric means the shape has a single degree of rotational symmetry (i.e., the number of orientations about a central axis where the shape is in the same overlapping orientation is one, where a shape of one-fold symmetry—a rotation of 360 degrees—is not rotationally symmetric). For example, a perimeter of a cylinder may include a unique edge such that no other rotation, other than a 360-degree multiple, will match that orientation. For another example, a rotationally asymmetric shape may have a symmetric axis with parallel anisometric features which cause a single degree of rotational symmetry. In this manner, the rotationally asymmetric shape may act as a key.

Examples of asymmetric key features include a protrusion extending from a wall, a cavity recessed into a wall, or an angle of a surface of a guide feature. For example, the rotationally asymmetric key feature may be an angled surface with respect to a wall defining the insertion recess or a cut-out shape particular to rotation of the periphery of a print material container based on a corresponding key feature located on the periphery of the print material container. The asymmetric key feature may include multiple key elements. For example, the asymmetric key feature 118 may include a first keying shape in a first key direction with respect to insertion and a second keying shape in a second key direction with respect to rotation (e.g., the shapes may be perpendicular or oblique to each other). Such key shapes may be, for examples, a recess corresponding to a protrusion of a rim of a toner container or a protrusion corresponding to a recess of a rim of toner container.

The print material container 120 and the print component 100 may include complementary material transfer interfaces. For example, the print material container 120 may include a portion of container housing defining a port 124 to a print material chamber 128 containing print material and the material transfer interface 108 of the print component may be a portion of component housing defining a port 104 coupleable to port 124 of the print material container via the material transfer interface 108.

The print material container 120 may couple to the print component 100 in a variety of manners depending on desired implementation, such as a desired amount of sealing between the print material container 120 and the print component 100 to ensure, for example, an appropriate amount of print material is transferred. For examples, the print material container 120 may be coupled by abutting the rim of the container 120 to a base wall of a recess of the component 100, the print material container 120 and the print component 100 may be joined with complementary interfaces upon insertion and/or rotation, the print material container 120 may be interlocked with the print component 100 upon rotation of the container 120, the print material container 120 may be sealingly coupled to the print component 100 via an O-ring, the print material container 120 may be rotationally attachable and rotationally detachable from the print component 100, and the like.

The print material container 120 may rotate upon insertion, rotate before insertion, rotate after insertion, or in conjunction with insertion. The rotation 127 of the print material container 120 may be about the axis of the material transfer interface 108. The rotation 127 of the print material container 120 may generate pressure or otherwise form a seal between the print material container 120 and the print component 100 to transfer print material from the container 120 to the component 100. The rotation 127 of the print material container 120 may move the electrical contacts towards each other and generate an electrical connection between the print material container 120 and the print component 100.

The structure 126 of the container may include a guide wall which may be part of a housing of the container 120. As examples, the guide wall 108 may be a sidewall of the housing, a wall of a floor or ceiling of a cavity in the housing, a wall of a lip of an opening of the housing, a periphery of an enclosure of the housing, a physical divider of interior space within the housing, a protrusion extending from the housing, a protrusion extending into the housing, a portion of a unibody structure of the housing, and the like.

Figure 2:
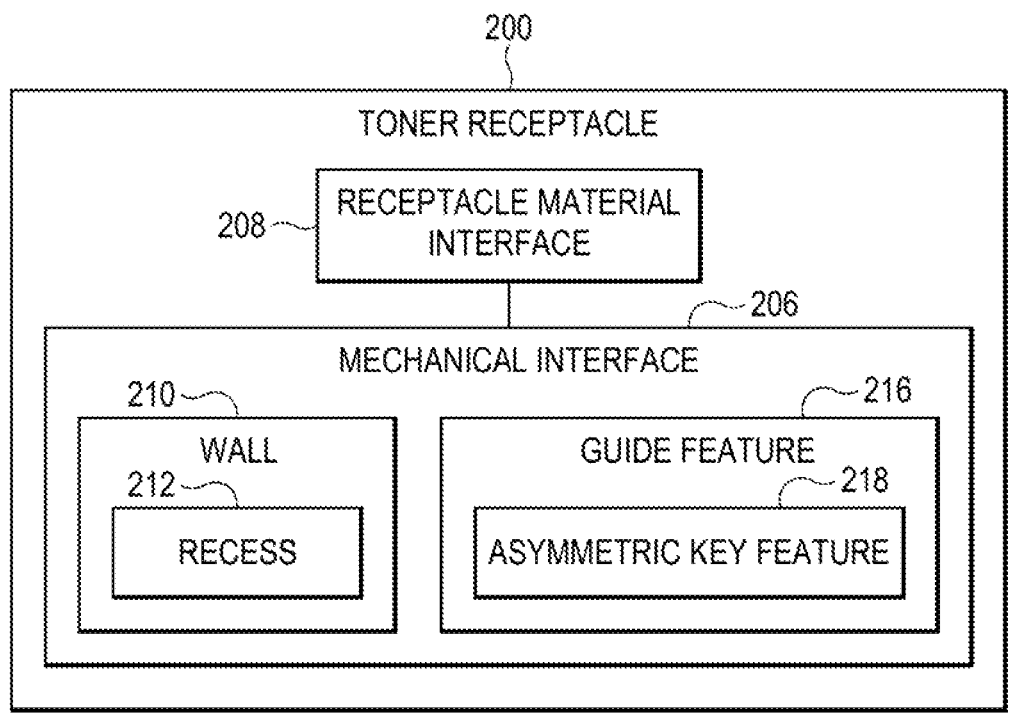
FIG. 2 is a block diagram depicting an example toner component.

FIG. 2 is a block diagram depicting an example toner component 200. The toner component 200 generally includes a component material interface 208 and a mechanical interface 206. The mechanical interface 206 may be coupled to the component material interface 208, such as a mechanical interface 206 forming a port that is part of the component material interface 208. The mechanical interface 206 generally includes a wall 210 defining a recess 212 into which a print material container may be received. For example, the recess 212 of the wall 210 may be defined to receive a toner container coupleable to the component material interface 208 via a container material interface of the toner container.

The mechanical interface 206 may also include a guide feature 216 with an asymmetric key feature 218 embedded in the guide feature. The guide feature 216 may extend from the wall 210 and may guide rotation of the toner container 200 about an axis of the mechanical interface (e.g., about a placement direction that goes into the recess 212). The asymmetric key feature 218 may allow for movement of a container material interface of a container towards the component material interface 208 upon rotation of the container about an axis of the mechanical interface (e.g., rotate within the recess in a direction guided by the guide feature 216). The component material interface 208 may located on a central axis of the mechanical interface 206 or the component material interface 208 may be located off-axis with respect to the axis of rotation of the mechanical interface 206 (e.g., the axis in the placement direction into the recess of the mechanical interface).

Figure 3:
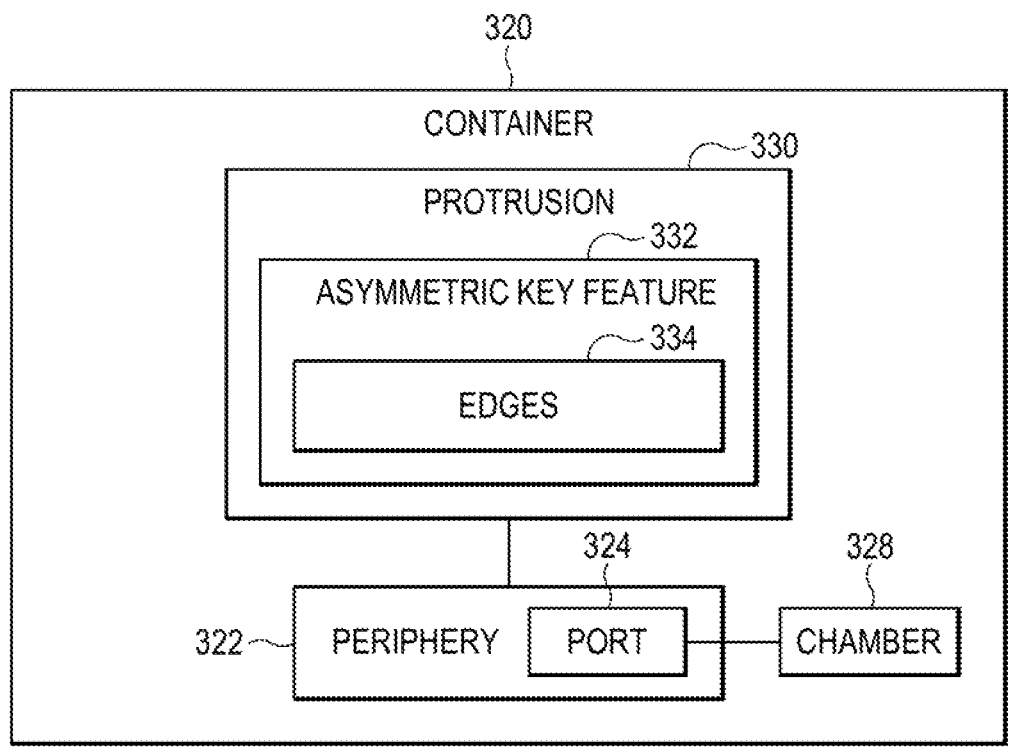
FIG. 3 is a block diagram depicting an example container.

FIG. 3 is a block diagram depicting an example container 320. The example container 320 generally includes a protrusion 330 with an asymmetric key feature 332 and a periphery 322 defining a port 324 for access to material located in a chamber 328 coupled to the port 324. The periphery 324 includes a rotationally asymmetric surface plane to guide rotation of the container about an axis that is substantially perpendicular to the rotationally asymmetric surface plane.

The protrusion 330 extends from the periphery 324. The protrusion 330 may include a face with a key feature 332 defined by edges 334 rotationally asymmetric with respect to the periphery 322. The edges 334 of the key feature 332 enable movement of the port 324 of the container 320 to a port on a component shell, such as the port 104 of FIG. 1B, with a complementary face corresponding to the edges 334 of the key feature 332. The edges 334 of the key feature 332 may act as a key to hinder movement of the port 324 of the container 320 towards a port of a component shell with a dissimilar face that does not correspond to the edges 334 of the key feature 332, For example, the key feature 332 may be a tooth or cavity that, upon rotation of the container, guides the key feature 332 past the complementary face of the component and guides the port 324 of the container 320 towards the material transfer interface of the component, e.g., towards a port of the component shell. The asymmetry of the key feature 332 may also assist in generating a seal for transferring material via a material transfer interface. For example, the key feature 332 may include an angle of a surface of the periphery 322 that, upon rotation of the container, generates pressure to spatially seal the port 324 of the container 320 to the port of the component shell.

Figure 4:
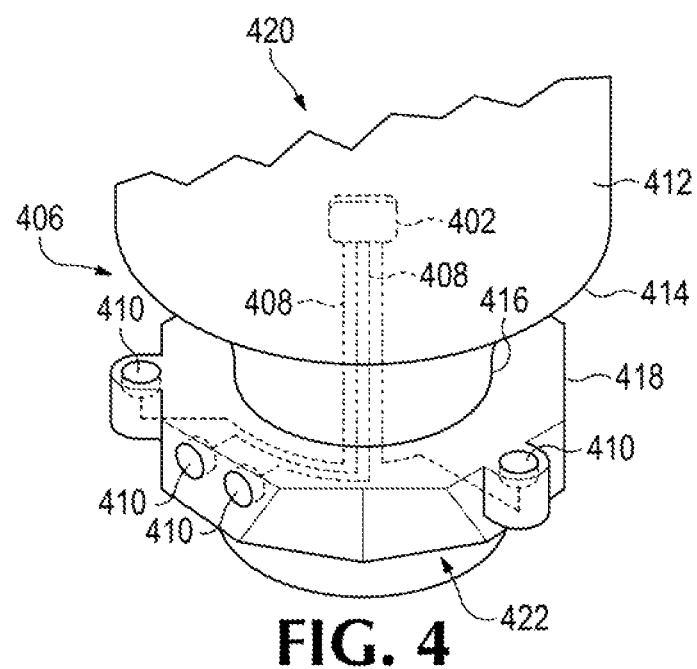
FIGS. 4 and 5 are isometric views of example print material containers.
Figure 5:
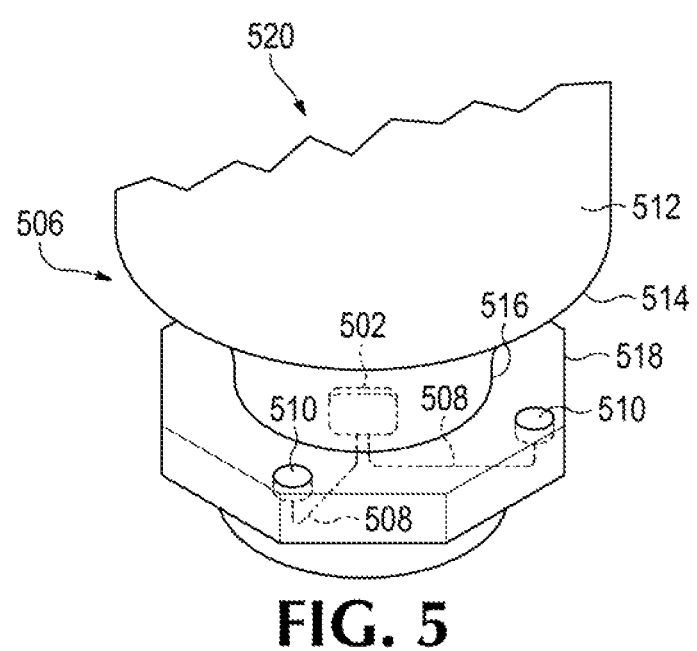

FIGS. 4 and 5 are isometric views of an example print material containers 420 and 520. The print material containers 420 and 520 generally include a housing with a print material chamber, a memory resource embedded in a wall of the housing, and an electrical contact electrically coupled to the memory resource, such as via an electrical lead. Referring to FIGS. 4-5, the print material containers 420 and 520 generally includes a housing defining a body, a neck, and a rim. The shape of the body, neck, and/or rim may act as a guideway or guideway counterpart to guide rotation of the print material container. The container periphery may include an externally exposed portion of the housing of the container, such as the exterior of the body, neck, or rim of the containers 420 and 520. For example, the periphery may include a rim extending from a neck of the container that includes a rotationally asymmetrical key feature corresponding to the key feature of the surface of the container interface of a print component.

In the example of FIG. 4, a print material chamber may be located within the body 414. The body 414 of FIG. 4 is depicted as generally tubular. In such an example, a cross-section of the tubular body may be any geometric shape. Other examples of body shapes include spherical, cuboid, a cube with rounded corners, a pyramid with rounded corners, and the like. In a similar fashion, neck shapes and rim shapes may be generally tubular with any number of geometric cross-sections (e.g., circle, square, triangle, rectangle with rounded corners, hexagon, etc.). In the example, of tubular chamber structure, a guide feature, such as guide feature 116 of FIG. 1A, may guide rotation about the axis of the tubular chamber.

The rim 418 defines a port coupled to the print material chamber located in the body 414. For example, the container periphery may include a rim around a neck of the container with a port located on a side wall of the rim or located on a surface of the rim facing away from the print material chamber. The neck 416 is coupled to the body 414 and the rim 418 is coupled to the neck 416. The body 414, neck 416, and rim 418 may include a channel, series of channels, or other interface to guide print material from the print material chamber to the port defined by the rim 418. The electrical contacts may be located on an exterior surface of the rim, neck, body, or other portion of the housing. A memory resource may be embedded in a wall of the body, a wall of the neck, or a wall of the rim. Example implementations are shown in FIGS. 4-5. The examples of FIGS. 4-5 include a periphery that defines a port, such as the rim 418 and rim 518, and a chamber structure to contain print particles, such as the body 414 and 514. The periphery (such as rim 418 and rim 518) may include rotationally asymmetric features such as electrical contacts 410 and 510, protrusions on which the electrical contacts 410 and 510 are located, or recesses on which the electrical contacts 410 and 510 are located. The shape of the periphery may act as a guide feature to guide the container into position and as a key feature to guide movement, such as rotational movement, towards the material transfer interface (e.g., an interface to mate ports for print material transfer). The print component for receiving the containers, such as containers 420 and 520, may have a wall defining a boundary of a recess corresponding to a shape of the periphery of the print particle container.

The housings discussed herein may be made of any appropriate material formable into a container. For example, a polymer composite may be used to form the housing to define a print material chamber and a guide structure. Example plastic polymers may include thermoplastic polymers such as acrylonitrile butadiene styrene (ABS), synthetic resins such as vinyl, semi-synthetic organic compounds, organic polymers, and the like. Other appropriate structural materials useable to form the housing include metal, plastic, ceramic, glass, rubber, and the like, or any composite thereof. The guide structures (such as the guide features and key features discussed herein as well as any other portion of the housing as discussed herein) may be made of the same structural material as the remainder of the housing or may be made of different structural material.

Referring to FIG. 4, the memory resource 402 is embedded in a wall 412 of the rim 418 of the housing 406 of the container 420. Electrical contacts 410 are asymmetrically located on an exterior surface of the rim 418 and coupled to the memory resource 402 via electrical leads 408. Any number of electrical contacts may be used. The electrical leads 408 may be connected to a communication interface of the memory resource 402 and/or connected to a power interface of the memory resource 402. For example, some of the electrical contacts 410 may be used to transfer power, data, or may be an electrical ground. Some of the electrical contacts 410 of FIG. 4 are located on a surface of the rim 418 facing towards the body 414 on substantially opposing sides of the neck 416 and some of the electrical contacts 410 are located on a surface of the rim 418 on a side wall. The plurality of electrical contacts 410 of the container 420 may be located in any appropriate position, such as in an asymmetric pattern. The plurality of electrical contacts of the print component may be located across from each other on oblique side walls of the recess to complement the location of the electrical contacts 410 of the print material container 420. The rim 418 may define a port coupled to a channel in the neck 416 coupled to a print material chamber in the body 414, In this manner, the memory resource 402 may be embedded in a wall of the body 414 defining a chamber, such as for print material.

The rim 418 may include a lofted feature with a shape of varying cross-sections, such as lofted feature 422 of FIG. 4. A lofted feature may have two cross sectional edges having shapes, for example, where the two shapes are different at the top and the bottom and the edges of the shapes are swept between the top and bottom to create a loft. For example, the lofted feature may include a surface plane to guide rotation of the print material container about an axis that is substantially perpendicular to the rotationally asymmetric surface plane and a cross-section parallel to the surface plane and having a different shape with respect to the surface plane to generate pressure upon rotation of the print material container.

Referring to FIG. 5, the memory resource 502 is embedded in a wall 512 of the neck 516 of the housing 506 of the container 520. Electrical contacts 510 are asymmetrically located on adjacent sides of an exterior surface of the rim 518 facing towards the body 514 and coupled to the memory resource 502 via electrical leads 508. The rim 518 may define a port coupled to a channel in the neck 516 coupled to a print material chamber in the body 514. In this manner, the memory resource 502 may be embedded in a wall of the neck 516 defining a channel between the print material chamber and the output port of the container. The shape of the rim 518, the neck 516, and/or the body 514 may act as a guideway or guideway counterpart to support rotation of the print material container 520 about an axis in a placement direction.

By embedding a memory resource with information about the print material container, the memory resource is protected by the container housing, for example. In this manner, the memory resource and the data stored thereon may maintain a level of integrity suitable for use with a print component and/or print apparatus. As an example, a secure smart-chip embedded in a container may provide data to a print apparatus to inform the device of attributes or features of the colorant or other particulates related to the colorant of the container to the device or component. Example attributes or features may include chamber volume, mass of print material, print material remaining, print material type, print material characteristics, chemical composition, metallurgy, stir-rate integrity, and the like. The memory resource location for molding-in may be in an intricate or hard-to-reach location (e.g., unreachable without specialized equipment or significant container manipulation) during manufacturing that make integration with a colorant container (e.g., colorant container 520) without specialized equipment difficult. The memory resource may be located on a non-visible location within the molding of the print component or colorant container with electrical leads molded into the containers to limit the likelihood of a counterfeit chip being added after the manufacturing process, and a remote connection, via the electrical leads, to the print device or component may be established when physical contact and electrical conduction is made. By providing an electrical connection to the memory resource embedded in the print material container, information provided in the memory resource may be retrievable by a compute system to perform an operation of the print apparatus based on the information on the memory resource, for example.

The memory resources discussed herein may be a passively accessible storage medium or may be part of an active system capable of retrieving and sending data of the storage medium. For example, a component shell (into which fits the container) may include a processor resource electrically coupled to an electrical contact of the component shell in electrical communication with an electrical contact of the container such that the processor resource of the component shell is able to retrieve data from the memory resource of the container.

FIG. 6 is a sectional view of an example print material container 620 coupled to an example component 600. The print material container 620 is in a rotated state such that an electrical connection and a material transfer connection is made between the print material container 620 and the print component 600. The guideway 606 allows for rotation of the rim 618 to guide the electrical contacts 610 towards electrical contacts 640. The guideway 608 may include guide walls 603, 605, 607, 609, and 611 that may guide rotation of the print material container 620 about an axis of a placement direction into the guide way cavity. The lip 632 may act as a wall defining a boundary of a recess corresponding to a shape of the periphery of the print material container. In this manner, the lip 632 may act as a wall 110 of FIG. 1A, For example, the lip 632 may allow for insertion of the print material container into the space of the guideway 606 and the cavity of the guideway as defined by the guide walls 603, 605, 607, 609, and 611 may allow for and guide rotation of the rim 618 into the position depicted in FIG. 6. In this manner, the guideway 606 and/or lip 632 act a wall, such as wall 110 of FIG. 1A, defining a boundary of a recess corresponding to a shape of the periphery (e.g., rim 618) of the print material container 620. The combination of the lip 632 and locations of the electrical contacts 640 may act as a rotationally asymmetric key and, therefore, the shape of the recess (including the lip 632, guideway 606, and/or electrical contacts) may act as a surface, such as surface 114 of FIG. 1A, including a guide feature (to guide the print material container 620 into the recess and rotate about an axis along a direction of the recess) and a key feature (to guide movement of the port 650 towards the material transfer interface, such as the input port 636 of the print component 600).

The print material of the container 620 is transferable from the print material chamber 604 to an input port 636 of the component (e.g., via a channel of the neck of the container coupled to the chamber). The input port 636 is coupled to an output port 638 of the component 600 to transfer the print material to a print apparatus (e.g., the port of a toner component is able to be sealed and coupled to a toner receiving station of a print apparatus in a manner capable of print material transfer). For example, the container 620 may define a port 650 (e.g., coupled to or part of a rim of the container) coupled to the print material chamber 604 that is sealingly coupleable (e.g., able to be coupled in a manner that generates a seal) to a port 636 of a component 600, where the component 600 may be able to dispense print material from the print material chamber 604 to output port 638 via the connection between the container port 650 and the input port 636 of the component 600. In this manner, the input port 636, the output port 638, and the channels therebetween may act as a material transfer interface of the print component 600, such as a material transfer interface 108 of FIG. 1A. The output port 638 may act as a print apparatus interface (such as print apparatus interface 102) to couple the print material component to a print apparatus via the output port 638.

The print material container 620 is coupled to the print component 600 via a container interface. The container interface may include a print material transfer interface as described above and an electrical interface. In an example, the container 620 is a coupled to a shell of the component with a recessed interface to receive a rim of the container 620. In that example, an electrical contact on the component may be placed in a complementary location to the electrical contact of the container when the container is sealingly coupled to the recessed interface.

The print material container 620 includes a memory resource 602 and an electrical contact 610 coupled to the memory resource 602 via an electrical lead 608. When the print material container 620 is moved to the contact position, the electrical contact 610 aligns towards the electrical contact 640 of the print component 600. The electrical contact 640 of the component is electrically coupled to the controller 630 via electrical lead 642. The controller 630 is electrically coupled, via electrical lead 646, to the electrical contact 648 on the exterior of the component 600 at an electrical interface for a print apparatus. The controller 630 coupled to the component shell may include a processor resource electrically coupled to the electrical contact 640 on the component shell so that the processor resource is able to retrieve data from the memory resource 602. The electrical leads 608 may be connected to a communication interface of the memory resource 602 and/or connected to a power interface of the memory resource 602. As used herein, a communication interface is any appropriate circuitry to enable preparation of signals and/or transmission of signals along an electrical path. A power interface, as used herein, may refer to any appropriate circuitry to enable transfer of electrical power along an electrical path, including a ground connection for example. In some examples, the controller 630 may communicate data and provide power to the memory resource 602 over the same electrical path, such as manipulating characteristics of the signal to encode data.

The controller 630 may include a set of instructions that when executed cause the controller to retrieve data from the memory resource 602 of the print material container 620 via a first group of electrical leads 642 between the controller 630 and the electrical contacts 640 and provide a signal, via a second group of electrical leads 646, to the electrical contacts 648 where the signal corresponds to the data retrieved from the memory resource 602 of the print material container. In this manner, the controller 630 may provide (e.g., relay or actively transmit) the signal to be received by a print apparatus via an electrical connection with the electrical contacts 648 when the print component 600 is electronically coupled to a print material receiving station of the print apparatus.

The component shell may include a recess or other exterior surface that defines a guide feature to guide connection of the container to a receiving area such that the guide feature guides the electrical contact of the container towards an electrical contact of the receiving area. For example, the guide feature may be a recess that guides movement of electrical contacts of the container towards electrical contacts of the component (located inside the recess) upon insertion of the container into the recess of the component. For another example, the guide feature may be a protrusion with electrical contacts located thereon that align with electrical contacts on an exterior surface of the container when the mechanical port of the container mates with the protrusion of the component shell upon directing the container towards the component at the location of the protrusion.

The print component 600 may include a lip 632 protruding from a side wall defining a boundary of the recess to which the print material container 620 is insertable. The plurality of electrical contacts 640 of the print component 600 may be located on the lip 632 facing into the recess (e.g., facing a base wall defining a boundary of the recess). The lip 632 may be spaced apart from a base wall of the recess about a distance substantially equivalent to a width of a rim 618 of a print material container 620. The rim 618 of the print material container 620 may be shaped to be insertable into the recess at a first orientation and rotatable to a second orientation to align the plurality of electrical contacts 610 of the print material container 620 with the plurality of electrical contacts 640 on the print component 600. The plurality of electrical contacts 610 of the print material container 620 are located on a surface of the rim 618 facing away from the base wall of the recess when the print material container 620 is inserted into the recess.

In some examples, there may be a number of electrical contacts to, for example, provide obfuscation to electrical operation between the print material container and the print component. For example, a number of electrical contacts of the print component may be different from a number of electrical contacts of the print material container, in one example, a number of potential electrical contacts of the component is greater than the number of electrical contacts of the print material container.

The controller 630 may comprise a memory resource operatively coupled to a processor resource. A memory resource may contain a set of instructions that are executable by the processor resource and the set of instructions are operable to cause the processor resource to perform operations of a control program when the set of instructions are executed by the processor resource. For example, the processor resource may execute the set of instructions corresponding to a control program to perform communication operations to retrieve data from a memory resource or pass data from the memory resource 602, such as container data, to another processor resource or storage location.

A processor resource is any appropriate circuitry capable of processing (e.g., computing) instructions, such as one or multiple processing elements capable of retrieving instructions from a memory resource and executing those instructions. For example, the processor resource may be a central processing unit (CPU) that enables container data retrieval by fetching, decoding, and executing modules of instructions. Example processor resources include at least one CPU, a semiconductor-based microprocessor, a programmable logic device such as an application specific integrated circuit (ASIC), and the like. A processor resource may include multiple processing elements that are integrated in a single device or distributed across devices. A processor resource may process the instructions serially, concurrently, or in partial concurrence.

A memory resource represents a medium to store data utilized and/or produced by a print component or print apparatus. The medium is any non-transitory medium or combination of non-transitory media able to electronically store data. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. A memory resource may be integrated in the same device as a processor resource or it may be separate but accessible to that device and the processor resource. A memory resource may be distributed across devices. A memory resource may be a non-volatile memory resource such as read-only memory (ROM), a volatile memory resource such as random-access memory (RAM), a storage device, or a combination thereof.

FIGS. 7A-15C are top views of an example interface states between example print components (700, 800, 900, 1000, 1100, 1200, 1300, 1400, and 1500) and example print material containers (720, 820, 920, 1020, 1120, 1220, 1320, 1420, and 1520). The examples of FIGS. 7A-15C depict examples of print material containers having surfaces with a rotationally asymmetric key feature and/or examples of print components having surfaces with a rotationally asymmetric key feature, where, in some examples, the shape of the rotationally asymmetric key feature of the print material container corresponds to the shape of the rotationally asymmetric key feature of the print component to ensure proper mechanical connection, as an example.

Referring to FIG. 7A, the print material container 720 is inserted into a print component 700. The rim 718 of the print material container 720 is of a similar octagonal shape to the recess 704 defined by the housing of the print component 700. The recess 704 is a defined by a boundary wall, such as wall 110 of FIG. 1A. The electrical contacts 710 of the print material container 720 are not in contact with the electrical contacts 740 of the print component 700 in the state depicted in FIG. 7A. Upon rotation in the direction 721, the electrical contacts 710 of print material container 720 move towards electrical contacts 740 of the print component 700. In the state depicted in FIG. 7B, the electrical contacts 710 of the print material container 720 moved into a position to be in electrical connection with electrical contacts 740 of the print component 700. The rotation 721 is guided by guide wall 706. In this manner, the guide wall 706 supports rotation of the print material container 720 about an axis in a placement direction through the recess 704. The guide wall 706 may act as a guide feature, such as guide feature 116 of FIG. 1A and as a key feature, such as asymmetric key feature 118 of FIG. 1A. The rotation 721 may be about the central axis of the container 720. The connection position may be indicated by the rotationally asymmetric position of the electrical contacts 740. Though not included in the figures herein, visual features, such as arrows or lines to show alignment, may be used as a visual cue to indicate accurate insertion and rotation to the desired orientation. For example, an arrow may be placed on the component surface and the container may be rotated until an arrow on the container aligns with the arrow on the component.

Figure 8A:
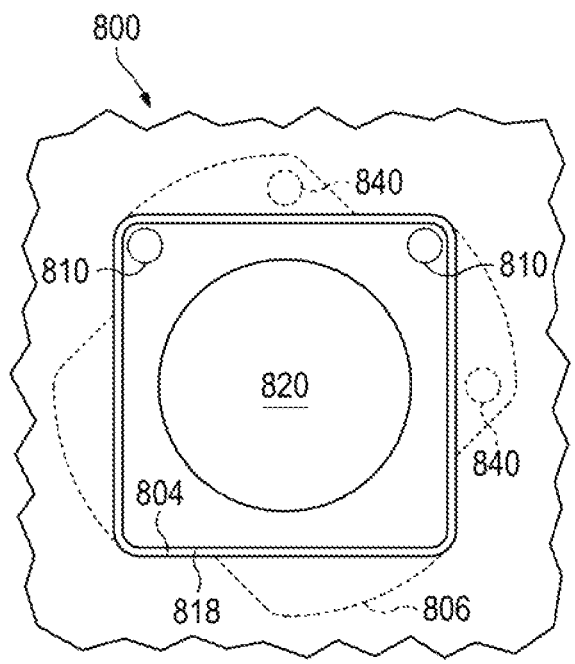
Figure 8B:
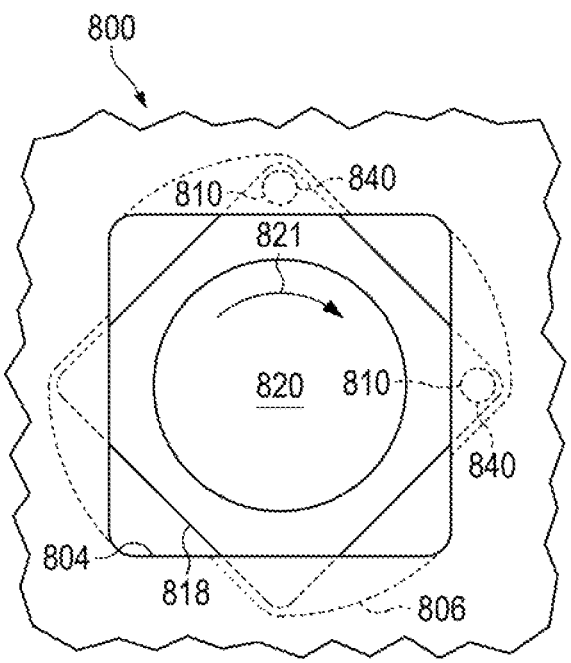

Referring to FIG. 8A, the print material container 820 is inserted into a print component 800. The rim 818 of the print material container 820 is of a similar quadrilateral shape to the recess 804 defined by the housing of the print component 800. The recess 804 is a defined by a boundary wall, such as wall 110 of FIG. 1A. The electrical contacts 810 of the print material container 820 are not in contact with the electrical contacts 840 of the print component 800 in the state depicted in FIG. 8A. Upon rotation in the direction 821, the electrical contacts 810 of print material container 820 move towards electrical contacts 840 of the print component 800. In the state depicted in FIG. 8B, the electrical contacts 810 of the print material container 820 moved into a position to be in electrical connection with electrical contacts 840 of the print component 800. The rotation 821 is guided by guide wall 806 that guides the container 820 to rotate until the appropriate electrical connection is made between electrical contacts 810 and 840. The guide wall 806 and/or the position of the electrical contacts 840 may indicate the rotationally asymmetric orientation to connect the container 820. The guide wall 806 may act as a guide feature, such as guide feature 116 of FIG. 1A and as a key feature, such as asymmetric key feature 118 of FIG. 1A.

Figure 9A:
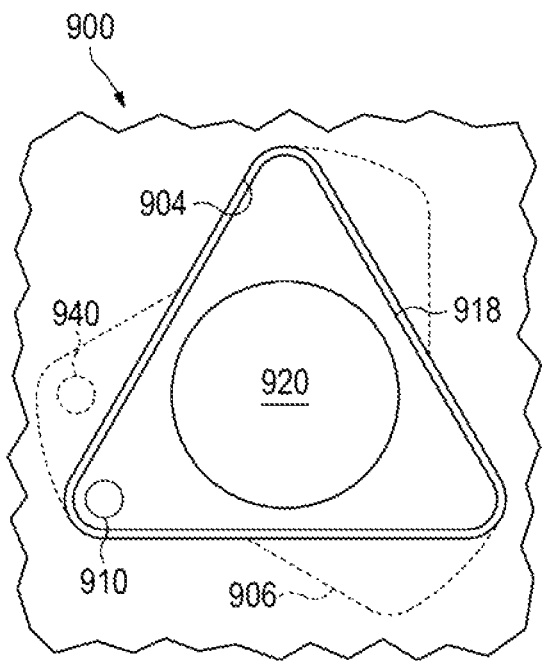
Figure 9B:
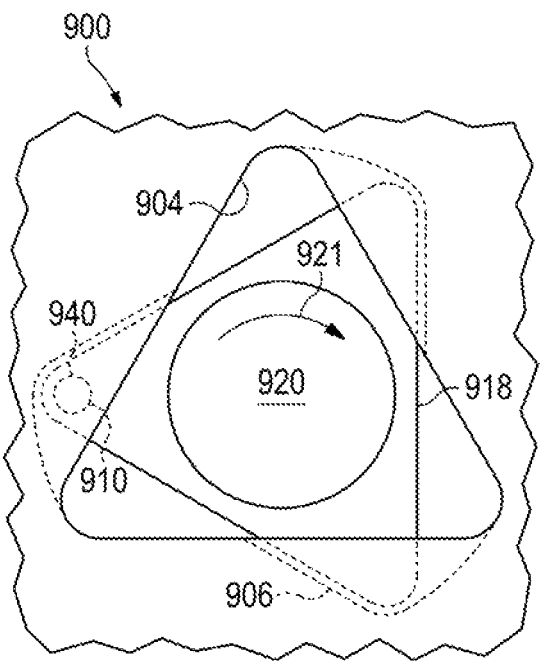

Referring to FIG. 9A, the print material container 920 is inserted into a print component 900. The rim 918 of the print material container 920 is of a similar triangular shape to the recess 904 defined by the housing of the print component 900. The recess 904 is a defined by a boundary wall, such as wall 110 of FIG. 1A. The electrical contact 910 of the print material container 920 is not in contact with the electrical contact 940 of the print component 900 in the state depicted in FIG. 9A. Upon rotation in the direction 921, the electrical contact 910 of print material container 920 moves towards electrical contact 940 of the print component 900, In the state depicted in FIG. 9B, the electrical contact 910 of the print material container 920 moved into a position to be in electrical connection with electrical contact 940 of the print component 900. In this manner, a protrusion including the electrical contact 910 rotates into a position to make an electrical connection with the component 900. The rotation 921 is guided by guide wall 906 that guides the container 920 to rotate until the appropriate electrical connection is made between electrical contacts 910 and 940. The guide wall 906 and/or the position of the electrical contact 940 may indicate the rotationally asymmetric orientation to connect the container 920. The guide wall 906 may act as a guide feature, such as guide feature 116 of FIG. 1A and as a key feature, such as asymmetric key feature 118 of FIG. 1A.

Figure 10A:
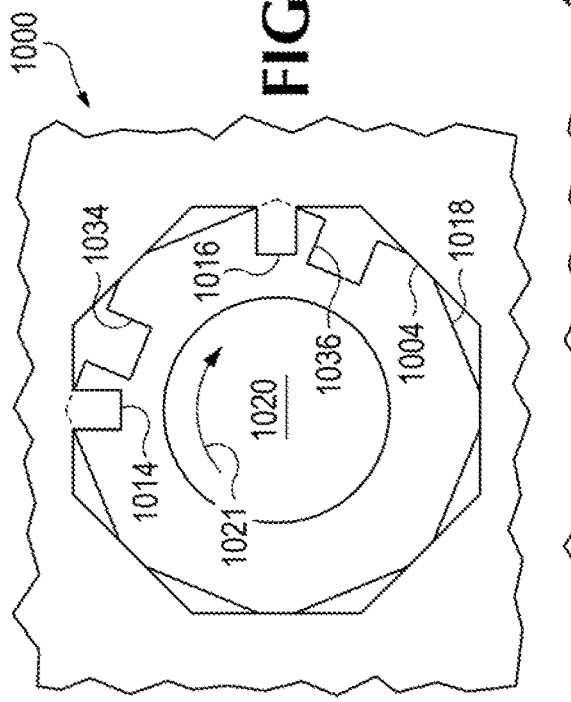
Figure 10B:
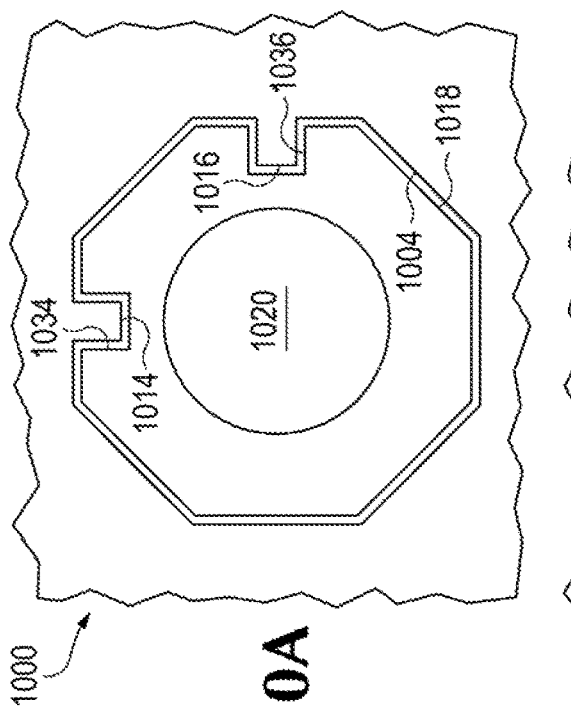

Referring to FIG. 10A, the print material container 1020 is inserted into a print component 1000. The recess 1004 has a shape that acts as a rotationally asymmetric key feature to guide movement of the port of the print material container 1020 into the recess 1004 and towards the material transfer interface. The recess 1004 may also include a guide feature to guide rotation of the print material container once inserted into the recess 1004. In this manner, the recess 1004 may have a shape defined by a wall, such as wall 110 of FIG. 1A, and includes a surface, such as surface 114 of FIG. 1A, that includes a guide feature and a key feature. The rim 1018 of the print material container 1020 is of a similar, generally octagonal shape to the recess 1004 defined by the housing of the print component 1000. In some examples, the rim 1018 may be a periphery, such as periphery 122 of FIG. 1B, that has a corresponding rotationally asymmetric key feature to guide movement of the print material container to the material transfer interface. The print material container 1020 includes a rotationally asymmetric shape of two features (i.e., recesses 1034 and 1036) that correspond with two rotationally asymmetric features (i.e., protrusions 1014 and 1016) of the print component 1000. In this manner, the shape of the recess 1004 allows for insertion of the container 1020 based on the key features of 1014 and 1016. In the state depicted in FIG. 10B, the container 1020 is rotated in the direction 1021 as guided by a wall of the recess 1004 and the rim 1018 passes underneath the protrusions 1014 and 1016 of the print component 1000. In this manner, the features of the shape of the recess 1004 of the component 1000 act both as a key and as a guide to allow the container 1020 to rotate into a position for proper access to the print material chamber of the container 1020 for transfer of the print material to the print component 1000.

Figure 11A:
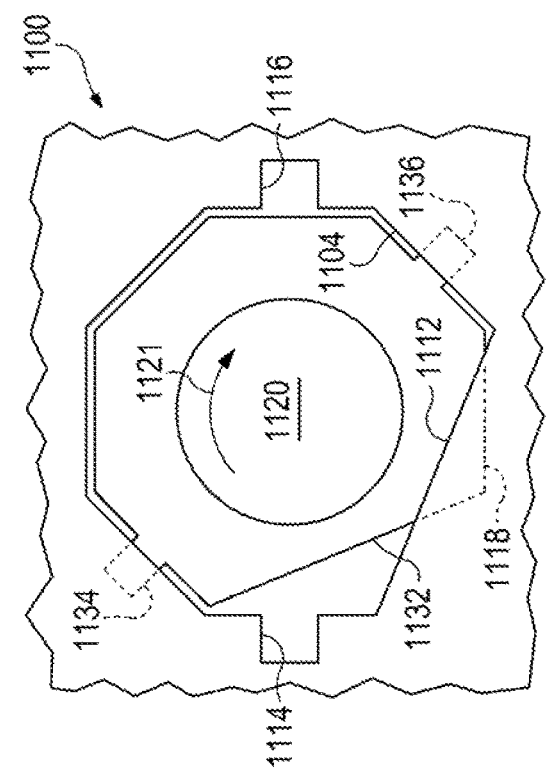
Figure 11B:
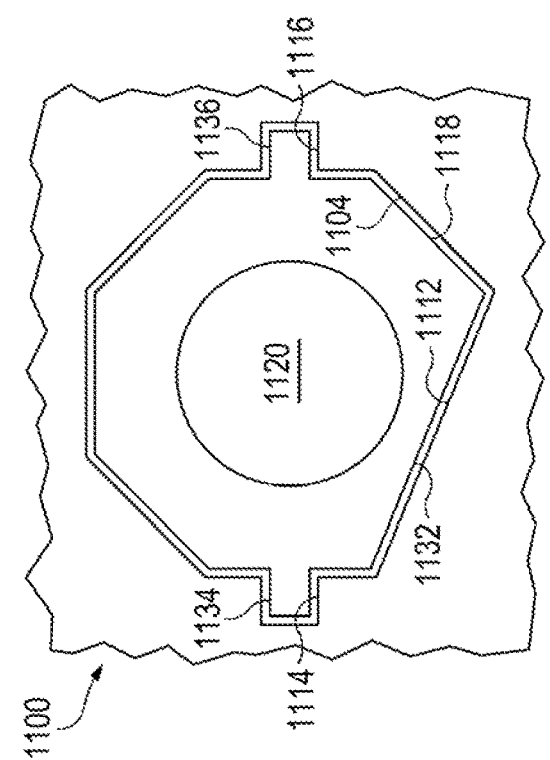

Referring to FIG. 11A, the print material container 1120 is inserted into a print component 1100. The recess 1104 has a shape that acts as a rotationally asymmetric key feature to guide movement of the port of the print material container 1120 into the recess 1104 and towards the material transfer interface. The recess 1104 may also include a guide feature to guide rotation of the print material container once inserted into the recess 1104. In this manner, the recess 1104 may have a shape defined by a wall, such as wall 110 of FIG. 1A, and includes a surface, such as surface 114 of FIG. 1A, that includes a guide feature and a key feature. The rim 1118 of the print material container 1120 is of a similar shape to the recess 1104 defined by the housing of the print component 1100. In some examples, the rim 1118 may be a periphery, such as periphery 122 of FIG. 1B, that has a corresponding rotationally asymmetric key feature to guide movement of the print material container to the material transfer interface. The print material container 1120 includes a rotationally asymmetric shape having the features of an asymmetrically angled wall 1132 and protrusions 1134 and 1136 that correspond with rotationally asymmetric features of the asymmetrically angled wall 1112 and recesses 1114 and 1116 of the print component 1100. In this manner, the shape of the recess 1104 allows for insertion of the container 1120 based on the key features of 1112, 1114, and 1116. In the state depicted in FIG. 11B, the container 1120 is rotated in the direction 1121 as guided by a wall of the recess 1104 and the rim 1118 passes underneath the surface of the print component 1100, such as under boundary of wall 1112. In this manner, the features of the shape of the recess 1104 of the component 1100 acts both as a key and as a guide to allow the container 1120 to rotate into a position for proper access to the print material chamber of the container 1120 for transfer of the print material to the print component 1100.

Figure 12A:
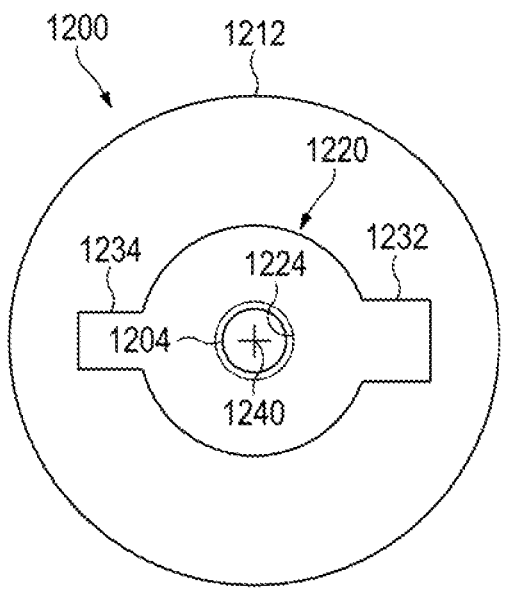
Figure 12B:
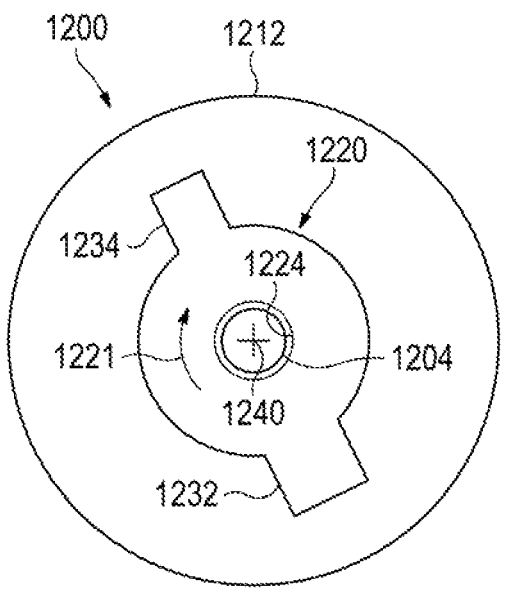

Referring to FIG. 12A, the print material container 1220 is inserted into a print component 1200, such as in a docked, untightened position. The print material container 1220 is residing in a recess 1212 defined by a wall (such as wall 110 of FIG. 1A) of the housing of the print component 1200. The recess 1212 and/or the periphery of the print material container 1220 may have a rotationally asymmetric shape. The print material container 1220 includes a rotationally asymmetric shape including the opposing, anisometric protrusions 1232 and 1234. The protrusions 1232 and 1234 may act as a guide feature and/or an asymmetric key feature of a surface of the print material container 1220. The container 1220 includes a port 1224 that corresponds to port 1204 of the component 1200. In the state depicted in FIG. 12B, the container 1220 is rotated in the direction 1221 about the axis 1240 which is centric to the ports 1204 and 1224. The rotation in the direction 1221, as guided or otherwise allowed by the shape of the container 1220 and/or the recess 1212, guides movement of the port 1224 of the print material container 1220 and towards the material transfer interface (e.g., the port 1204) of the print component 1200, The rotation in the direction 1221 may generate a seal between ports 1224 and 1204 to allow for proper transfer of material from the container 1220 and the component 1200. The container 1220 is in a docked, tightened position in the state of FIG. 12B.

Figure 13A:
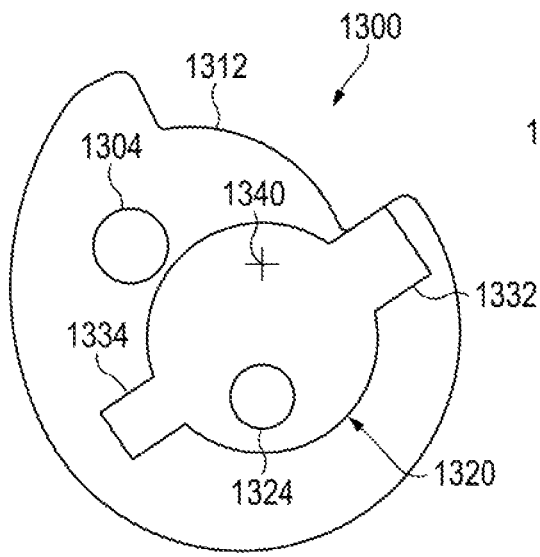
Figure 13B:
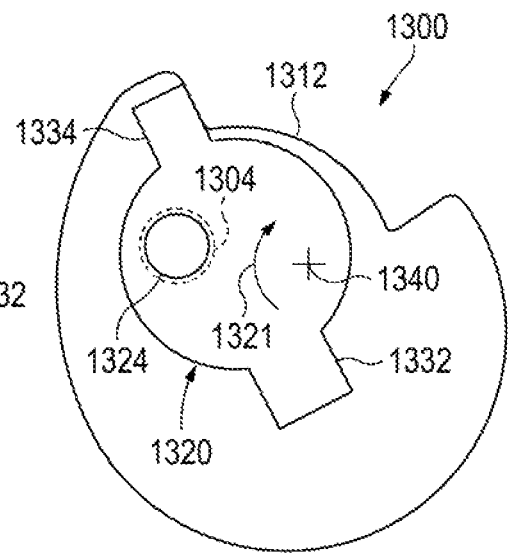

Referring to FIG. 13A, the print material container 1320 is inserted into a print component 1300, such as in a docked, displaced position. The print material container 1320 is residing in a recess 1312 defined by the housing of the print component 1300. The recess 1312 may have a rotationally asymmetric shape. The rotationally asymmetric shape as defined by the walls of the recess 1312 may act as a guide feature, such as guide feature 116 of FIG. 1A, and an asymmetric key feature, such as asymmetric key feature 118 of FIG. 1A. The print material container 1320 includes a rotationally asymmetric shape including the opposing, anisometric protrusions 1332 and 1334. The container 1320 includes a port 1324 and the component includes a port 1304, both of which are off-axis with respect to the recess 1312 (e.g., off-axis with respect to the axis along the direction of the recess into the print component 1300). In the state depicted in FIG. 13B, the container 1320 is rotated in the direction 1321 about the axis 1340 which is eccentric to center of the recess 1312 and the ports 1304 and 1324. The rotation in the direction 1321 may rotate the port 1324 of the container 1320 towards the location of the port 1304 of the print component 1300 and may align the port 1324 with the port 1304. The rotation 1321 may generate a seal between ports 1324 and 1304 to allow for proper transfer of material from the container 1320 and the component 1300. The container 1320 is in a docked, conjoined position in the state of FIG. 13B. In the manner described herein with respect to FIGS. 12A-13B, the mating surfaces may be aligned and rotate upon the axis of alignment or may be offset (but parallel) and rotate eccentrically with respect to the rotation of the container and/or location of insertion.

Figure 14A:
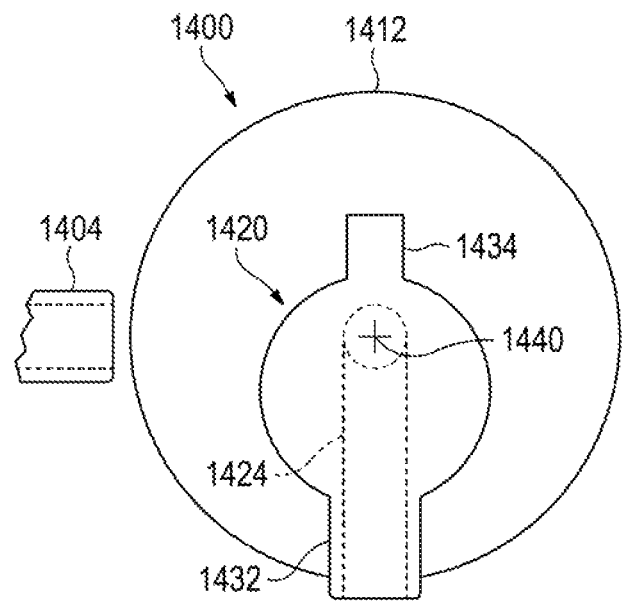
Figure 14B:
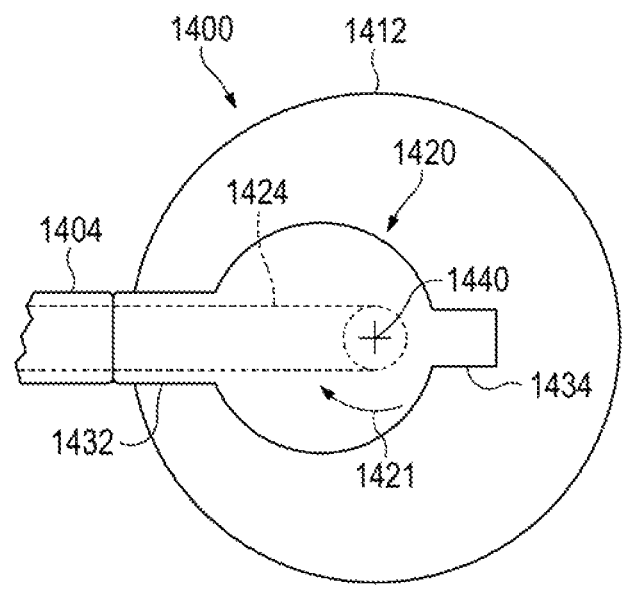

Referring to FIG. 14A, the print material container 1420 is inserted into a print component 1400, such as in a docked, disconnected position. The print material container 1420 is residing in a recess 1412 defined by the housing of the print component 1400. The recess 1412 may have a rotationally asymmetric shape or feature, such as the location of the port 1404 of the material transfer interface. A wall defining the recess 1412 may include a surface with a guide feature to allow rotation of the print material container 1420 within the recess 1412. The print material container 1420 includes a rotationally asymmetric shape including the opposing, anisometric protrusions 1432 and 1434. The container 1420 includes a port 1424 defined within protrusion 1432. The housing of the component 1400 defines a port 1404 to be complementary to the port 1424. In the state depicted in FIG. 14A, the ports 1404 and 1424 are disconnected. In the state depicted in FIG. 14B, the container 1420 is rotated in the direction 1421 about the axis 1440, which may be an axis of a protrusion used as a point of connection upon insertion of the container 1420 into recess 1412 of the print component 1400. The rotation in the direction 1421 may move port 1424 of the container 1424 towards the port 1404 of the print component 1400. The rotation may align the ports 1404 and 1424 to create a channel between the container 1420 and the component 1400. The rotation may generate a seal between ports 1424 and 1404 to allow for proper transfer of material from the container 1420 and the component 1400, such as through a channel formed by connecting ports 1404 and 1424. The container 1420 is in a docked, connected position in the state of FIG. 14B.

Figure 15A:
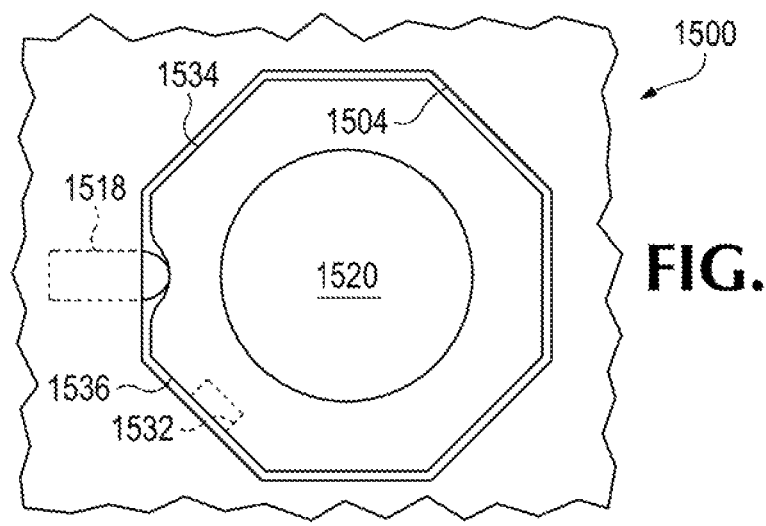
Figure 15B:
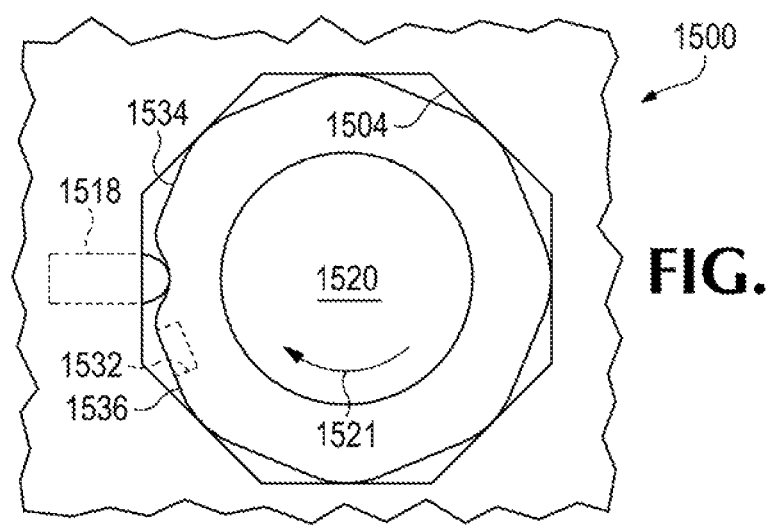
Figure 15C:
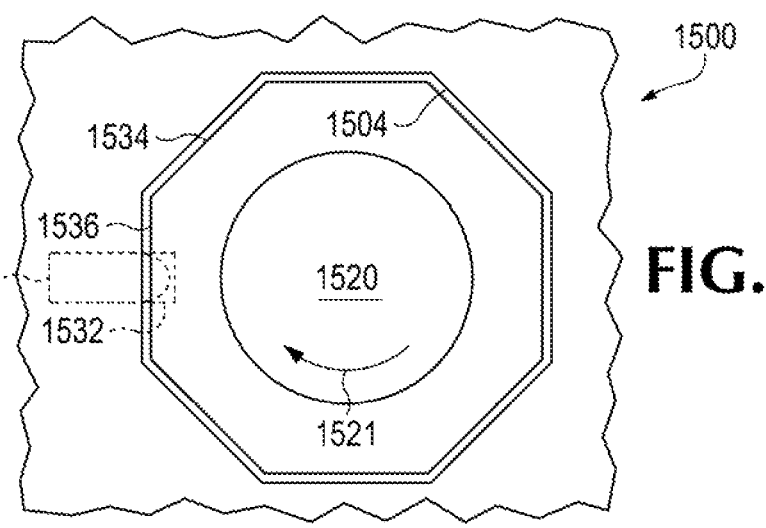

Referring to FIG. 15A, the print material container 1520 is inserted into a print component 1500, such as in a docked, unsecured position. The print material container 1520 is residing in a recess 1504 defined by a wall of the housing of the print component 1500. The container 1520 may include a cavity 1532 that is asymmetrically located, such as on the rim of the container 1520. The recess 1504 and/or the print material container 1520 may have a rotationally asymmetric structure independent of the symmetry of the shape. The print material container 1520 includes a rotationally asymmetric structure where the materials of 1534 and 1536 are more flexible than the other walls of the rim of the container 1520. The flexibility of the container walls 1534 and 1532 may allow for the container 1520 to rotate in the direction 1521 against a key feature 1518 of the print component 1500 such that the protrusion 1518 contacts wall 1536 as shown in FIG. 15S. Further rotation in the direction 1521 may allow the protrusion 1518 to fit in the complementary cavity 1532 of the container 1520 as shown in FIG. 15C. In this manner, the key features of material and shape may guide rotational movement of the print material container to an appropriate location to assist transfer of print material and allow for a specific, complementary pair of container and component to couple appropriately.

Figure 16:
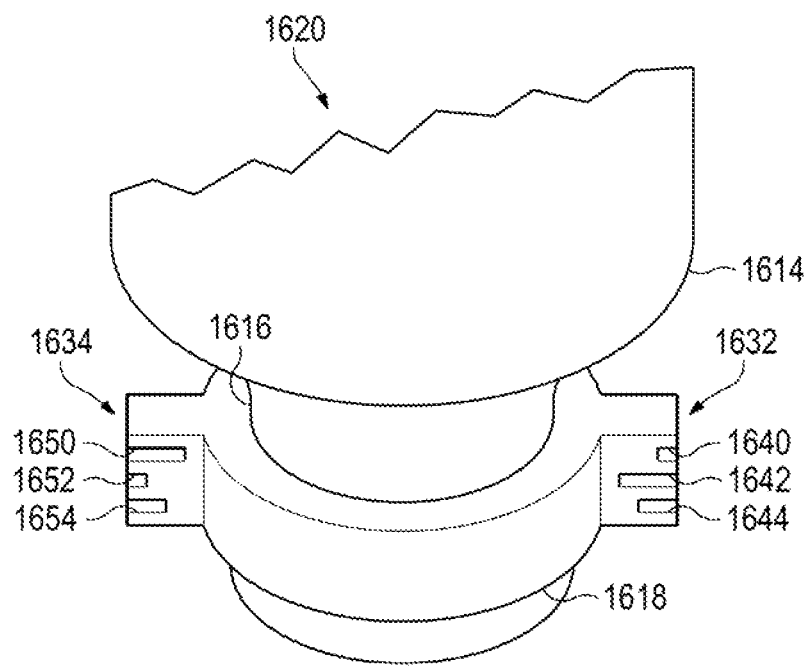
FIG. 16 is an isometric view of an example print material container.

FIG. 16 is an isometric view of an example print material container 1620. The print material container 1620 includes a body 1614, a neck 1616, and a rim 1618. The print material container 1620 includes two guide features 1632 and 1634 extending from the rim 1618. The guide features 1632 and 1634 are protrusions including a number of key features, which are recesses 1640, 1642, 1644, 1650, 1652, and 1654 formed on the protrusions. The recess 1640, 1642, and 1644 on protrusion 1632 are asymmetric (e.g., anisometric) with respect to their counterpart recess 1650, 1652, and 1654 on protrusion 1634. A component recess wall may include corresponding protrusions to the recesses such that another container may be hindered from rotation unless the container includes a periphery with appropriately corresponding key features that guide movement towards the material transfer interface.

Figure 17:
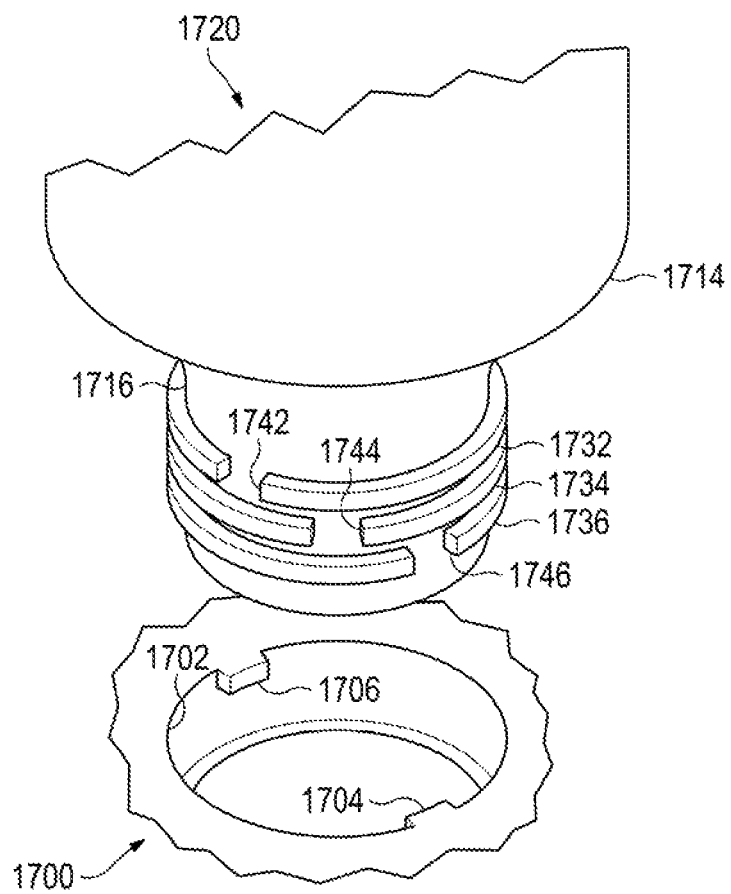
FIG. 17 is an isometric view of an example print material container and an example print component.

FIG. 17 is an isometric view of an example print material container 1720 and an example print component 1700. The print material container 1720 includes a body 1714, a neck 1716, and features 1732, 1734, and 1736 extending from the neck. The print component 1700 includes a wall defining a recess 1702 for receiving the print material container 1720 when the appropriate key features are correctly mated. In the example of FIG. 17, the print component 1700 includes features 1704 and 1706 and the container 1720 may move into the recess when the container is rotated to a window 1742, 1744, and 1746 that corresponds to the protruding features 1704 and 1706 of the component 1700. In this manner, the features 1732, 1734, and 1736 may act as a guideway with respect to the protrusions 1704 and 1706.

The features 1732, 1734, 1736, 1742, 1744, and 1746 may be rotationally asymmetric. For example, the length, width, angle, shape, and/or location of each of the features on the container periphery may vary. In this manner, the features 1732, 1734, 1736, 1742, 1744, and 1746 may act as key for the container 1700 to properly dock into the component 1700 (e.g., guide movement of the port of the print material container 1720 towards the material transfer interface of the print component 1700). For example, the surface of the container interface may include a plurality of key features that correspond to levels of rotation and levels of movement of the toner container towards the material transfer interface of the print material component, where each level may act as a key that allows the container to move closer to a docked and sealed position as each level of features are met.

Figure 18A:
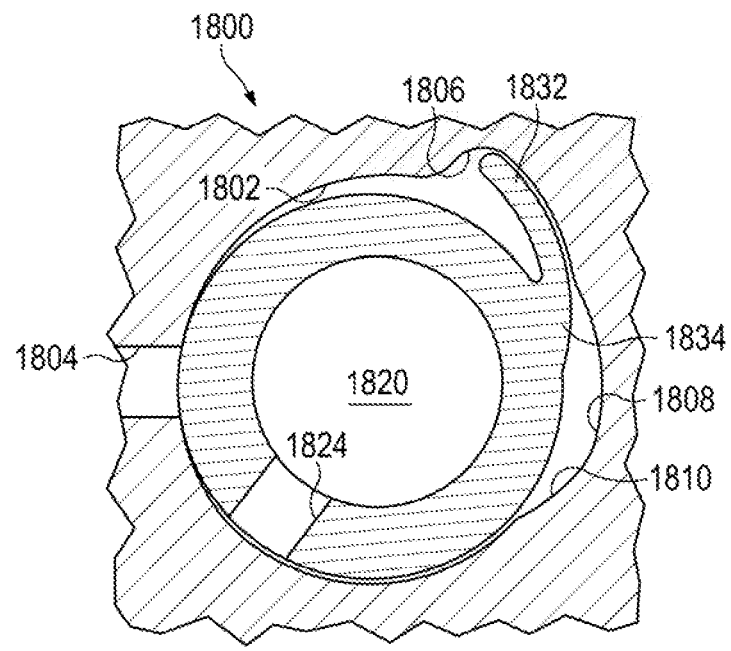
FIGS. 18A and 18B are top views of example interface states between an example print component and an example print material container.
Figure 18B:
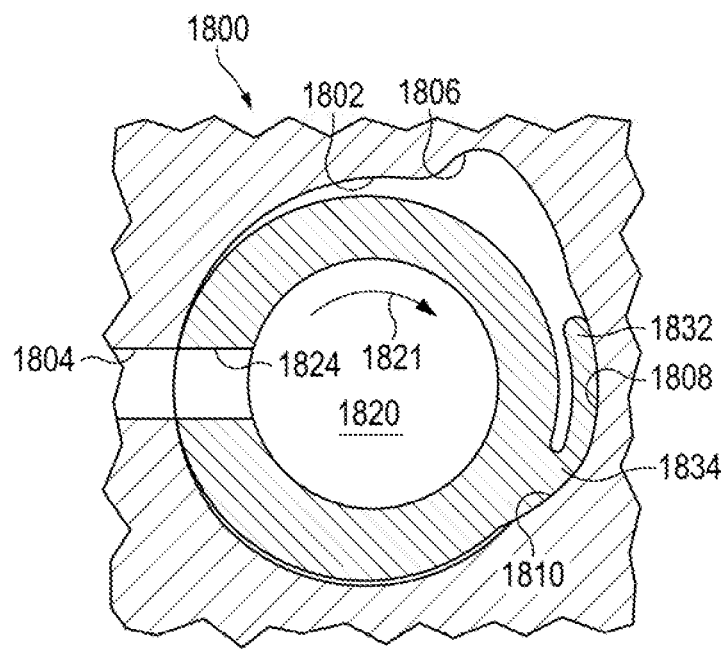

FIGS. 18A and 18B are top views of example interface states between an example print component 1800 and an example print material container 1820. The print material container 1820 may include a print material chamber, a material transfer interface (e.g., port 1824) coupled to the print material chamber, and a mechanical interface corresponding to a mechanical interface of the print component 1800. For example, the mechanical interface of the print component may be a recess and the mechanical interface of the print container may be a protrusion that fits in the recess of the print component. The mechanical interface of the container 1820 of FIG. 18A includes a wall 1834 with an asymmetrically located key feature 1832. The key feature 1832 of the print material container 1820 fits in a feature 1806 of the recess 1802 of the print component 1800 upon insertion of the container 1820 into the recess 1802.

As shown in FIG. 18B, the key feature 1832 of the container 1820 moves from feature 1806 towards wall 1808 upon rotation of the print material container 1820 in the direction 1821. Upon rotation of the print material container to the position shown in FIG. 18B, the key feature 1832 of the container 1820 generates a sealing force substantially perpendicular to the direction of rotation and towards the material transfer interface (e.g., port 1824). In the state of FIG. 18B, the sealing force is also in the direction of port 1804 of the print component 1800.

The force may be generated by placing the key feature 1832 of the container in a smaller or closer location upon rotation. In the example of FIG. 18A, feature 1806 is an accommodating recess and, in the example of 18B, the wall 1808 provides less space to generate a force to deform wall 1834 and/or feature 1832 and place a force to locate the container 1820 in the opposing direction of the wall 1808. For example, the opposing side of the asymmetrically-located key feature may be where the force is placed on the component to generate a seal between the container and the component. The recess 1802 may include a shape to hinder over-rotation, such as shown in FIG. 18B where the extension of wall 1834 abuts the hindering wall 1810 of the recess 1802. In this manner, the ports 1804 and 1824 may be sealed in a manner using a force generated from a rotationally asymmetric feature of the container 1820 (e.g., feature 1832) and/or component 1800 (e.g., wall 1808), where the rotationally asymmetric feature may be a shape, structure, or material type that is asymmetric to another portion of the container or component. In this manner, the walls 1806, 1808, and 1810 define a recess 1804 with a surface that has a guide feature to guide rotation of the print material container 1820 about an axis along a direction of the recess (e.g. the insertion direction) and a key feature rotationally asymmetric with respect to the periphery of the print material container 1820 to guide movement of the port 1824 towards the material transfer interface (e.g. port 1804) of the print component 1800.

By implementing a print material container and/or the print component with a guide structure that enables movement of mechanical interfaces upon rotation, a proper material transfer interface may be, for example, ensured between the print material container and the print component.

All of the features disclosed in this specification (including any accompanying claims, abstract and drawings), and/or all of the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus. Furthermore, the use of the words "first," "second," or related terms in the claims are not used to limit the claim elements to an order or location, but are merely used to distinguish separate claim elements.

The present description has been shown and described with reference to the foregoing examples. It is understood, however, that other forms, details, and examples may be made without departing from the spirit and scope of the following claims.

What is claimed is:

1. A print material component comprising:
   a print apparatus interface to couple the print material component to a print apparatus, the print apparatus interface defining a first port;
   a print particle container comprising:
      a periphery defining a second port; and
      a chamber structure defining a chamber coupled to the second port,
   the chamber to contain print particles; and
   a container interface comprising:
      a material transfer interface coupled to the first port and coupleable to the second port;
      a wall defining a boundary of a recess corresponding to a shape of the periphery of the print particle container; and
      a surface defining:
         a guide feature to guide rotation of the print particle container about an axis along a direction of the recess; and
         a key feature rotationally asymmetric with respect to the periphery, the key feature to guide movement of the second port towards the material transfer interface.

2. The print material component of claim 1, wherein:
   the chamber of the chamber structure is tubular and the guide feature guides rotation about the axis of the tubular chamber.

3. The print material component of claim 1, wherein:
   the material transfer interface is off-axis with respect to the axis along the direction of the recess.

4. The print material component of claim 1, wherein:
   the periphery comprises a rim extending from a neck of the container, the rim including a rotationally asymmetrical key feature corresponding to the key feature of the surface of the container interface.

5. The print material component of claim 1, wherein:
   the periphery comprises a rim around a neck of the container; and
   the second port is located on a side wall of the rim or located on a surface of the rim facing away from the print particle container.

6. The print material component of claim 1, wherein:
   the rotationally asymmetric key feature is:
   an angled surface with respect to the wall; or
   a cut-out shape particular to rotation of the periphery of the print particle container based on a corresponding key feature located on the periphery of the print particle container.

7. The print material component of claim 1, wherein the periphery includes a lofted feature including:
   a surface plane to guide rotation of the print particle container about an axis that is substantially perpendicular to the rotationally asymmetric surface plane; and
   a cross-section parallel to the surface plane and having a different shape with respect to the surface plane to generate pressure upon rotation of the print particle container.

8. The print material component of claim 1, wherein:
   the surface of the container interface includes a plurality of key features that correspond to levels of rotation and levels of movement of the print particle container towards the material transfer interface of the print material component.

9. A toner receptacle comprising:
   a receptacle material interface; and
   a mechanical interface coupled to the receptacle material interface, the mechanical interface comprising:
      a wall defining a recess to receive a toner container couplable to the receptacle material interface via a container material interface;
      a guide feature extending from the wall, the guide feature to guide rotation of the toner container about an axis of the mechanical interface; and
      an asymmetric key feature embedded in the guide feature to allow movement of the container material interface towards the receptacle material interface upon rotation of the toner container about the axis of the mechanical interface.

10. The toner receptacle of claim 9, wherein the asymmetric key feature is:
    a protrusion extending from the wall;
    a cavity recessed into the wall; or
    an angle of a surface of the guide feature.

11. The toner receptacle of claim 10, wherein:
    the receptacle material interface is located off-axis with respect to the axis of the mechanical interface.

12. The toner receptacle of claim 11, wherein:
    the asymmetric key feature includes a first keying shape in first key direction with respect to insertion and a second keying shape in a second key direction with respect to rotation, the first and second keying shapes being:
    a recess corresponding to a protrusion of a rim of a toner container; or
    a protrusion corresponding to a recess of a rim of a toner container.

13. A print particle container to supply print particles to a print particle receptacle of a host device, the print particle container comprising:
    a periphery defining a port coupled to a chamber, the periphery including a rotationally asymmetric surface plane to guide rotation of the container about an axis that is substantially perpendicular to the rotationally asymmetric surface plane; and
    a protrusion extending from the periphery, the protrusion including a face with a key feature defined by edges rotationally asymmetric with respect to the periphery, wherein:
    the edges of the key feature enable movement of the port of the print particle container to a port on a shell associated with the print particle receptacle having a complementary face corresponding to the edges of the key feature; and the edges of the key feature hinder movement of the port of the print particle container towards a port of a shell having a dissimilar face that does not correspond to the edges of the key feature.

14. The print particle container of claim 13, wherein:

the key feature is an angle of a surface of the periphery that, upon rotation of the print particle container, generates pressure to spatially seal the port of the print particle container to the port of the shell associated with the print particle receptacle; or the key feature is a tooth or cavity that, upon rotation of the print particle container, guides the key feature past the complementary face and guides the port of the print particle container towards the port of the shell associated with the print particle receptacle.

15. A print particle container, comprising:

a print material chamber;

a material transfer interface coupled to the print material chamber; and a mechanical interface including a wall comprising an asymmetrically-located key feature that, upon rotation of the print particle container, generates a sealing force substantially perpendicular to the direction of rotation and towards the material transfer interface.

\* \* \* \* \*